(12) United States Patent
Chang (10) Patent No.: US 9,125,218 B2
(45) Date of Patent: Sep. 1, 2015

(54) METHOD OF HANDLING RANDOM ACCESS PROCEDURE ON PRIMARY CELL WHEN RANDOM ACCESS PROCEDURE ON SECONDARY CELL IS ONGOING OR ABOUT TO START

(71) Applicant: HTC Corporation, Taoyuan County (TW)

(72) Inventor: Po-Yu Chang, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 336 days.

(21) Appl. No.: 13/621,296

(22) Filed: Sep. 17, 2012

(65) Prior Publication Data

US 2013/0070700 A1 Mar. 21, 2013

Related U.S. Application Data

(60) Provisional application No. 61/535,376, filed on Sep. 16, 2011.

(51) Int. Cl.
*H04W 74/08* (2009.01)
(52) U.S. Cl.
CPC .......... *H04W 74/0833* (2013.01); *H04W 74/08* (2013.01)
(58) Field of Classification Search
None
See application file for complete search history.

(56) References Cited

U.S. PATENT DOCUMENTS

| 8,457,647 | B2* | 6/2013 | Tynderfeldt et al. | 455/450 |
| 8,923,251 | B2* | 12/2014 | Wu | 370/336 |
| 2011/0134774 | A1* | 6/2011 | Pelletier et al. | 370/252 |
| 2012/0082107 | A1* | 4/2012 | Ou et al. | 370/329 |
| 2012/0257510 | A1* | 10/2012 | Jeong et al. | 370/242 |
| 2013/0010711 | A1* | 1/2013 | Larsson et al. | 370/329 |
| 2013/0182687 | A1* | 7/2013 | Ng et al. | 370/336 |
| 2014/0023052 | A1* | 1/2014 | Yang et al. | 370/336 |

OTHER PUBLICATIONS

ETSI TS 136 321 V10.2.0 (Jun. 2011);Technical Specification LTE;Evolved Universal Terrestrial Radio Access (E-UTRA); Medium Access Control (MAC) protocol specification;(3GPP TS 36.321 version 10.2.0 Release 10).
TSG-RAN Working Group 2 meeting #75bis R2-115650; Zhuhai, China, Oct. 10-14, 2011.

* cited by examiner

*Primary Examiner* — Hassan Kizou
*Assistant Examiner* — Roberta A Shand
(74) *Attorney, Agent, or Firm* — Winston Hsu; Scott Margo (57) ABSTRACT

A method of handling a first random access procedure on a Primary Cell (PCell) for a mobile device when a second random access procedure on a Secondary Cell (SCell) is ongoing or is about to start is disclosed. The method comprises selectively initiating the first random access procedure on the PCell according to a result of the second random access procedure after the mobile device completes the second random access procedure on the SCell, wherein the first random access procedure is triggered by a pending scheduling request of the mobile device and the second random access procedure is triggered by need of synchronization on the SCell.

8 Claims, 6 Drawing Sheets

METHOD OF HANDLING RANDOM ACCESS PROCEDURE ON PRIMARY CELL WHEN RANDOM ACCESS PROCEDURE ON SECONDARY CELL IS ONGOING OR ABOUT TO START

CROSS REFERENCE TO RELATED APPLICATIONS

This application claims the benefit of U.S. Provisional Application No. 61/535,376, filed on Sep. 16, 2011 and entitled "Method for handling SR RACH when a RACH is ongoing or about to start on a SCell", the contents of which are incorporated herein in their entirety.

BACKGROUND OF THE INVENTION

1. Field of the Invention

The application relates to a method in a wireless communication system, and more particularly, to a method of handling a random access procedure on a Primary Cell for a mobile device when a random access procedure on a Secondary Cell is ongoing or about to start.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, a radio access network known as an evolved universal terrestrial radio access network (E-UTRAN) includes a plurality of evolved Node-Bs (eNBs) for communicating with a plurality of user equipments (UEs) and communicates with a core network including a mobility management entity (MME), serving gateway, etc for NAS (Non Access Stratum) control.

A long term evolution-advanced (LTE-A) system, as its name implies, is an evolution of the LTE system, considering relaying for cost-effective throughput enhancement and coverage extension. For example, a relay can be deployed at the cell edge where the eNB is unable to provide required radio quality/throughput for the UEs or at certain location where radio signals of the eNB cannot cover. The LTE-A system can support a wider bandwidth up to 100 MHz to satisfy requirement for peak data rate. Carrier aggregation (CA) where two or more component carriers are aggregated is employed for the LTE-A system to achieve wider-band transmission. An LTE-A specification supports carrier aggregation for both continuous and non-continuous component carrier (CC) with each component carrier limited to a maximum of 110 resource blocks. The carrier aggregation increases spectrum flexibility by aggregating the component carriers in the different frequency band (non-continuous spectrum).

When CA is configured, the UE only has one RRC connection with the network. At RRC connection establishment/re-establishment, one serving cell provides the security input (one ECGI, one PCI and one ARFCN) and the NAS mobility information (e.g. TAI). This cell is referred to as the Primary Cell (PCell). Depending on UE capabilities, Secondary Cells (SCells) can be configured to form together with the PCell a set of serving cells. The configured set of serving cells for a UE always consists of one PCell and one or more SCells.

A UE shall not perform any uplink transmission except the Random Access (RA) Preamble transmission if its uplink transmission timing is unsynchronized. A Random Access procedure is used to achieve uplink time synchronization for a UE which either has not yet acquired, or has lost, its uplink synchronization. The random access procedure comes in two forms, contention-based or non contention-based. In a contention-based random access procedure, a random access preamble signature is randomly chosen by the UE, with the result that it is possible for more than one UE simultaneously to transmit the same signature, leading to a need for a subsequent contention resolution process. Contention Resolution is based on either C-RNTI on PDCCH of the PCell or UE Contention Resolution Identity on a downlink share channel (DL-SCH). For the non contention-based random access procedure, the eNodeB has the option of preventing contention from occurring by allocating a dedicated signature to a UE, resulting in contention free access.

Figure 1A:
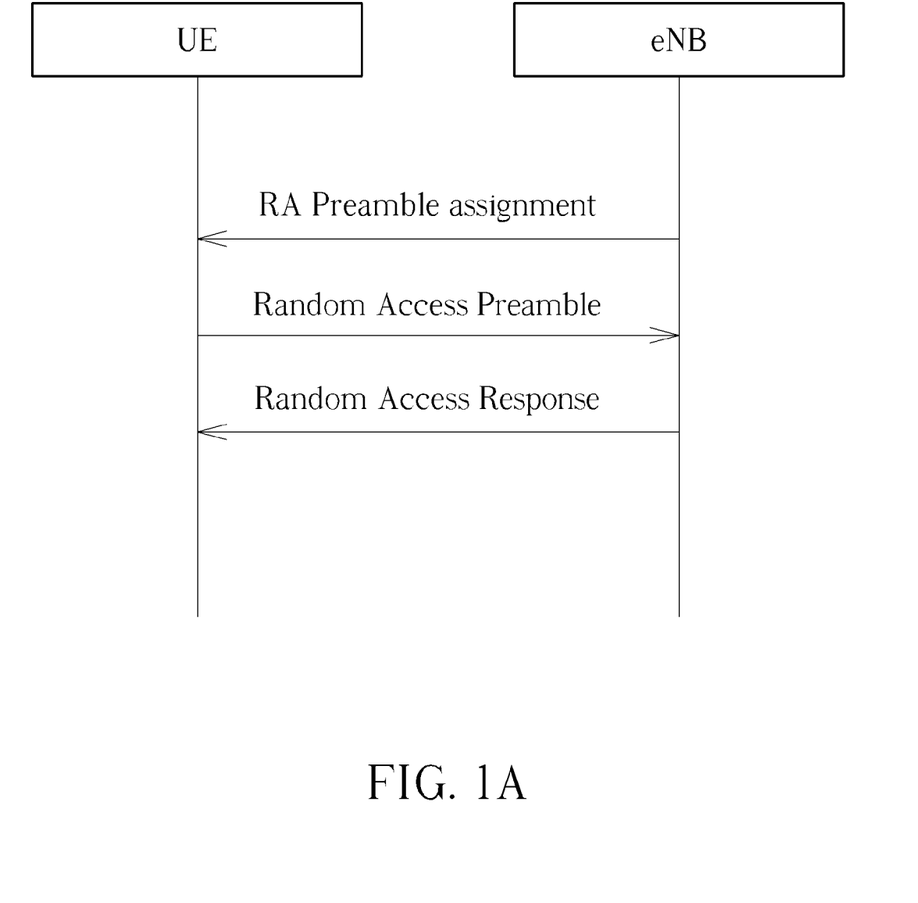
FIGS. 1A and 1B are diagrams showing two kinds of random access procedures in the prior art.
Figure 1B:
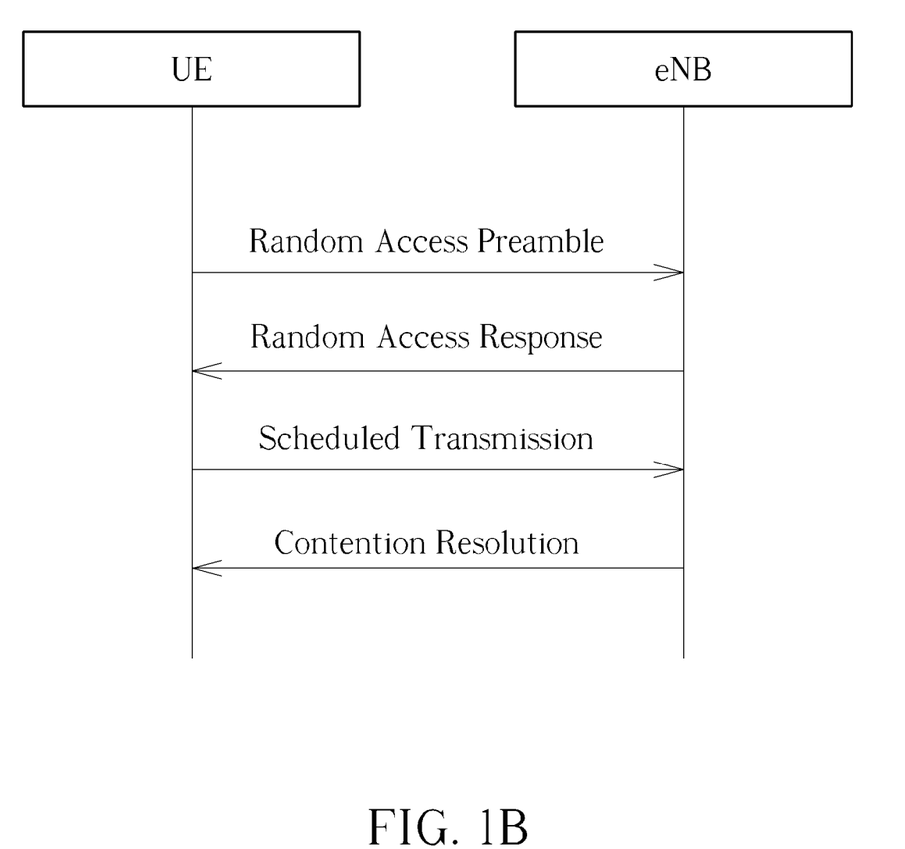

FIGS. 1A and 1B are diagrams showing two kinds of random access procedures in the prior art. As seen in FIG. 1A, the three steps of non-contention based random access procedures are: random access preamble assignment via dedicated signaling in downlink; random access preamble on random access channel in uplink; random access response on downlink shared channel (DL-SCH). The E-UTRAN needs to transmit an RA response (RAR) corresponding to the RA preamble to the UE. A MAC RAR usually consists of three fields: TA Command (Timing Advance Command)/UL Grant/Temporary C-RNTI. In FIG. 1B, the four steps of the contention based random access procedures are: random access Preamble on RACH in uplink; random access response generated by eNB on DL-SCH; first scheduled uplink transmission on uplink shared channel (UL-SCH); Contention Resolution on downlink. The UE can perform either contention-based or non contention-based random access procedure on PCell, but the UE can only perform non contention-based random access procedure on SCell.

So far, the UE does not need to support parallel random access procedures in order to avoid increasing the complexity in the UE implementation. However, if a random access procedure on a SCell triggered by need of SCell synchronization (e.g. triggered by a PDCCH order received on the SCell or on a scheduling cell of the SCell) is ongoing or is about to start, meanwhile, the UE also tries to initiate random access procedure on a PCell triggered by SR. In some situations, the UE may trigger an SR. When an SR is triggered, it shall be considered as pending until it is cancelled. As long as one SR is pending, for each transmission time interval (TTI), if the UE has no available uplink share channel (UL-SCH) resources in this TTI and the UE has no valid PUCCH resource for SR in any TTI, the UE will initiate a random access procedure and cancel all pending SRs. All pending SR(s) shall be cancelled when a MAC protocol data unit (PDU) is assembled and this PDU includes a buffer status report (BSR) which contains buffer status up to (and including) the last event that triggered a BSR, or when the UL grant(s) can accommodate all pending data available for transmission. Similarly, the UE may be requested by an eNB to perform a random access procedure during initiating another random access procedure on a PCell triggered by SR. In above cases, the UE will perform parallel random access procedures.

SUMMARY OF THE INVENTION

Methods of handling a first random access procedure on a PCell for a mobile device when a second random access procedure on a SCell is ongoing or is about to start are disclosed, so as to avoid the mobile device performing parallel random access procedures.

A method of handling a first random access procedure on a PCell for a mobile device when a second random access procedure on a SCell is ongoing or is about to start is disclosed. The method comprises selectively initiating the first random access procedure on the PCell according to a result of the second random access procedure after the mobile device completes the second random access procedure on the SCell, wherein the first random access procedure is triggered by a scheduling request (SR) of the mobile device and the second random access procedure is triggered by need of synchronization on the SCell.

A method of handling a first random access procedure on a PCell for a mobile device when a second random access procedure on a SCell is ongoing is disclosed. The method comprises prohibiting initiating the first random access procedure on the PCell when the mobile device has a pending scheduling request (SR) and is performing the second random access procedure on the SCell, wherein the second random access procedure is triggered by need of synchronization on the SCell.

A method of handling a first random access procedure on a PCell for a mobile device when a second random access procedure on a SCell is ongoing or is about to start is disclosed. The method comprises aborting the second random access procedure on the SCell when the mobile device initiates the first random access procedure on the PCell, wherein the second random access procedure is triggered by need of synchronization on the SCell and the first random access procedure is triggered by a scheduling request (SR) of the mobile device.

A method of handling a first random access procedure on a PCell for a mobile device when a second random access procedure on a SCell is ongoing or is about to start is disclosed. The method comprises delaying the second random access procedure on the SCell until the mobile device completes the first random access procedure on a PCell, wherein the second random access procedure is triggered by need of synchronization on the SCell and the first random access procedure is triggered by a scheduling request (SR) of the mobile device.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
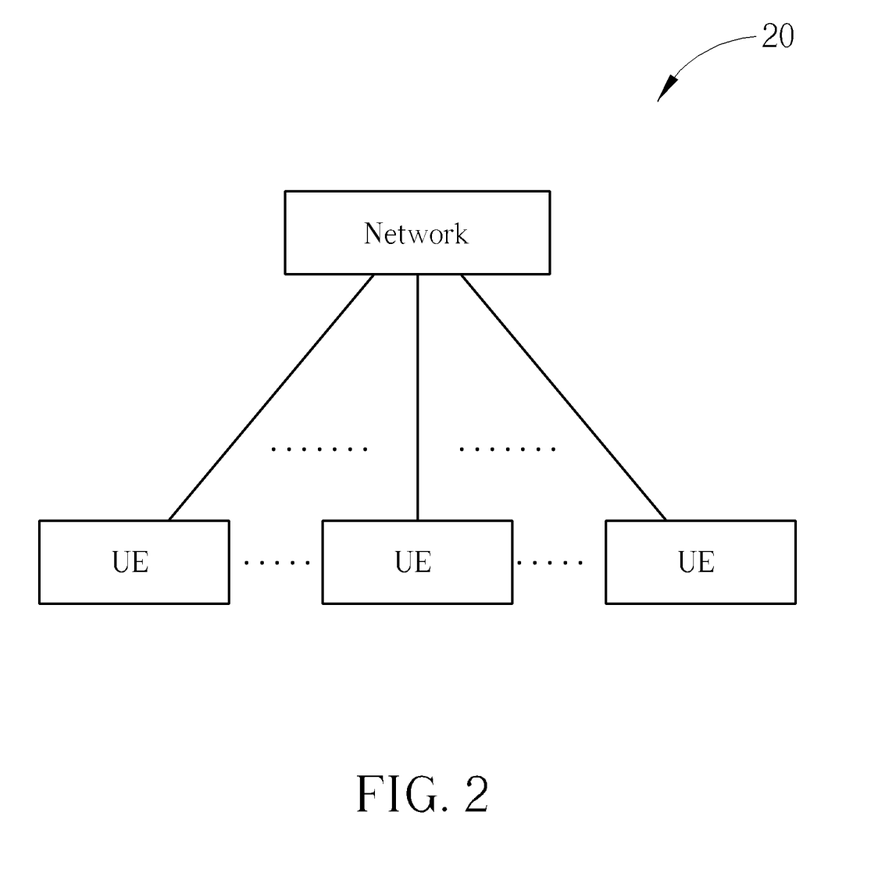
FIG. 2 is a schematic diagram of an exemplary wireless communication system.

Please refer to FIG. 2, FIG. 2 is a schematic diagram of an exemplary wireless communication system 20. The wireless communication system 20 can be an LTE-Advanced system, or other mobile communication systems. The wireless communication system 20 is briefly composed of a network and a plurality of user equipments (UEs). To achieve bandwidth extension, the wireless communication system 20 supports carrier aggregation (CA), where two or more component carriers (CCs) are aggregated. In the CA arrangement, a single UE may be assigned radio resources on more than one CC. The configured set of serving cells for a UE always consists of one Primary Cell (PCell) and one or more Secondary Cells (SCells). The component carrier corresponding to PCell is primary CC (PCC) and to SCell is secondary CC (SCC). In the downlink, the carrier corresponding to the PCell is the Downlink Primary Component Carrier (DL PCC) while in the uplink it is the Uplink Primary Component Carrier (UL PCC). In the downlink, the carrier corresponding to an SCell is a Downlink Secondary Component Carrier (DL SCC) while in the uplink it is an Uplink Secondary Component Carrier (UL SCC).

In the LTE-Advanced system, the network is referred as an evolved universal terrestrial radio access network (E-UTRAN) comprising a plurality of evolved base stations (eNBs). The UEs can be devices such as mobile devices, mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 3:
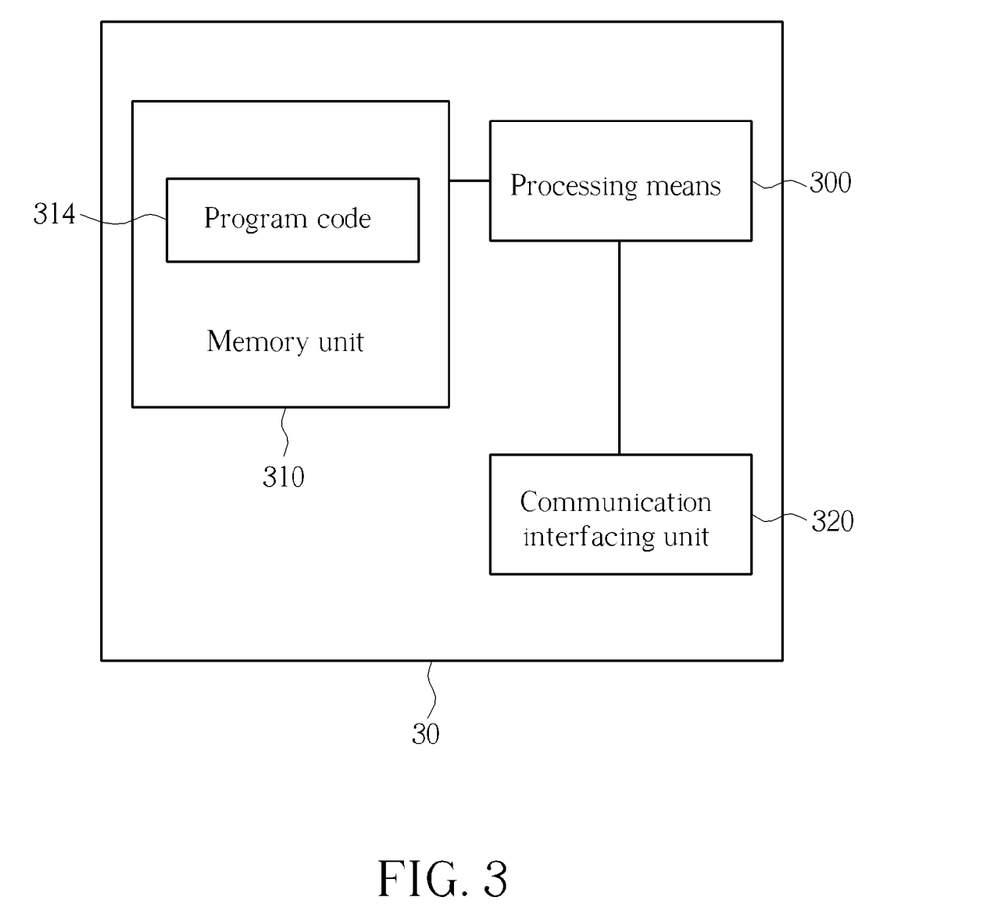
FIG. 3 is a schematic diagram of an exemplary communication device.

Please refer to FIG. 3, FIG. 3 is a schematic diagram of an exemplary communication device 30. The communication device 30 can be the UE or the network shown in FIG. 2 and may include a processing means 300 such as a microprocessor or ASIC, a memory unit 310, and a communication interfacing unit 320. The memory unit 310 may be any data storage device that can store program code 314 for access by the processing means 300. Examples of the memory unit 310 include but are not limited to a subscriber identity module (SIM), read-only memory (ROM), random-access memory (RAM), CD-ROMs, magnetic tapes, floppy disks, and optical data storage devices. The communication interfacing unit 320 is preferably a radio transceiver for wirelessly communicating with the network according to processing results of the processing means 300.

Figure 4:
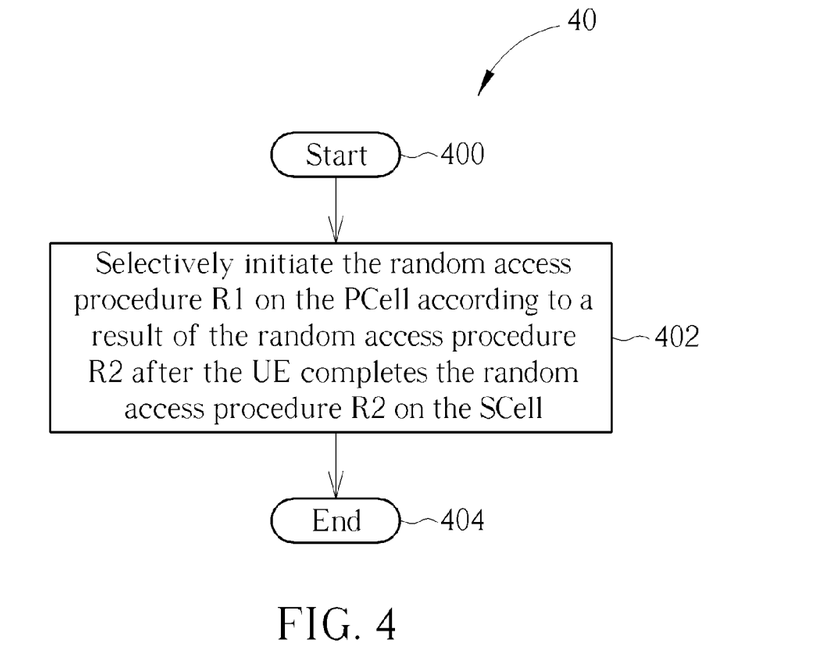
FIG. 4 is a flow chart of an exemplary process.

Please refer to FIG. 4, which is a flow chart of an exemplary process 40. The process 40 is used for a UE for handling a random access procedure R1 on a PCell when a random access procedure R2 on a SCell is ongoing or is about to start. The UE could be the UE in the wireless communication system 20 and implemented by the communication device 30. The random access procedure R1 is triggered by a pending scheduling request (SR) of the UE. The random access procedure R2 is triggered by need of synchronization on the SCell (e.g. triggered by a PDCCH order received on the SCell or on a scheduling cell of the SCell). The process 40 can be compiled into the program code 314 and includes the following steps:

Step 400: Start.

Step 402: Selectively initiate the random access procedure R1 on the PCell according to a result of the random access procedure R2 after the UE completes the random access procedure R2 on the SCell.

Step 404: End.

According to the process 40, the UE does not perform the parallel random access procedures. The UE completes the random access procedure R2 on the SCell first. After the completion of the random access procedure R2, the UE selectively initiates the random access procedure R1 on the PCell according to the result of the random access procedure R2. In one embodiment, the UE does not initiate the random access procedure R1 when the random access procedure R2 is completed such that all pending SR(s) of the UE are canceled; otherwise, the UE initiates the random access procedure R1. For example, when the random access procedure R2 has been successfully completed, the UE will get uplink grant(s) via the random access response and then perform uplink transmission. If the UL grant(s) can accommodate all pending data available for transmission, the UE will cancel all pending SRs and thus will not need to initiate the random access procedure R1 on the PCell. That is, the reason why the UE performs a random access procedure triggered by a pending SR on PCell is to get an uplink grant from the network. Thus, if the UE can get the uplink grant by first performing the random access procedure on the SCell, the UE will not need to initiate the random access procedure on the PCell. Therefore, in addition to avoiding the UE performing parallel random access procedures, the process 40 may also achieve the effect of saving more UE power if no need to perform the random access procedure on PCell.

In another embodiment, the UE is prohibited to initiate the random access procedure R1 on the PCell when the UE has a pending SR and the random access procedure R2 on SCell is ongoing.

Figure 5:
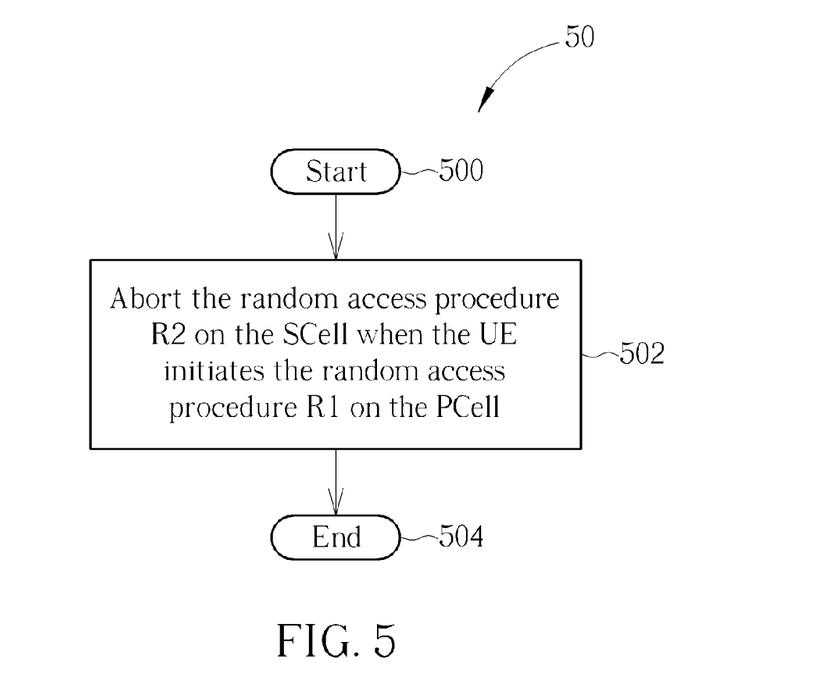
FIG. 5 is a flow chart of an exemplary process.

Please refer to FIG. 5, which is a flow chart of an exemplary process 50. The process 50 is used for a UE for handling the random access procedure R1 on a PCell when the random access procedure R2 on a SCell is ongoing or is about to start. The UE could be the UE in the wireless communication system 20 and implemented by the communication device 30. The process 50 can be compiled into the program code 314 and includes the following steps:

Step 500: Start.

Step 502: Abort the random access procedure R2 on the SCell when the UE initiates the random access procedure R1 on the PCell.

Step 504: End.

According to the process 50, the UE does not perform the parallel random access procedures. The UE aborts the random access procedure R2 on the SCell when the UE initiates the random access procedure R1 on the PCell. The random access procedure R2 is triggered by need of synchronization on the SCell. The random access procedure R1 is triggered by a pending SR of the UE, i.e. the random access procedure R1 is triggered by the UE itself and is a contention-based random access procedure. Namely, the UE aborts the random access procedure R2 on the SCell when the UE initiates a contention-based random access procedure triggered by the UE itself.

Therefore, the UE does not perform the random access procedure R1 on the PCell and the random access procedure R2 on the SCell at the same time. The process 50 can prevent the UE from having parallel random access procedures.

Figure 6:
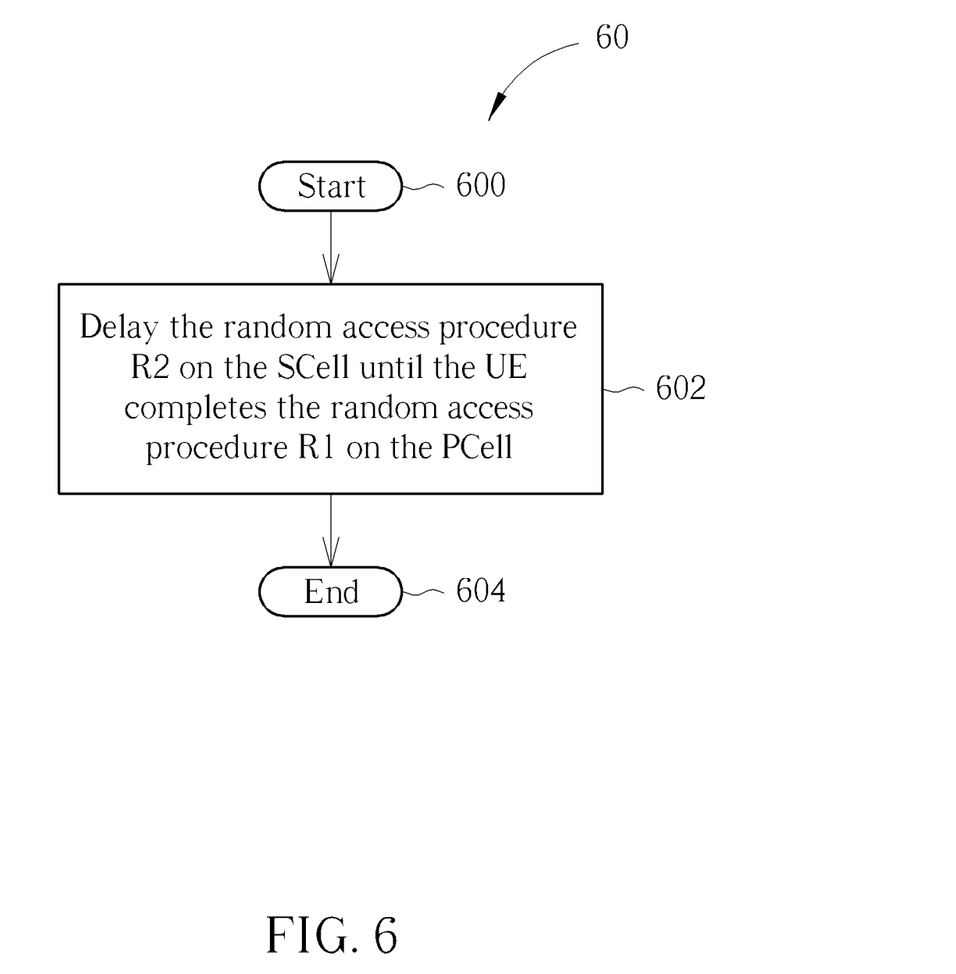
FIG. 6 is a flow chart of an exemplary process.

Please refer to FIG. 6, which is a flow chart of an exemplary process 60. The process 60 is used for a UE for handling a random access procedure R1 on the PCell when a random access procedure R2 on the SCell is ongoing or is about to start. The UE could be the UE in the wireless communication system 20 and implemented by the communication device 30. The process 60 can be compiled into the program code 314 and includes the following steps:

Step 600: Start.

Step 602: Delay the random access procedure R2 on the SCell until the UE completes the random access procedure R1 on the PCell.

Step 604: End.

According to the process 60, the UE does not perform the parallel random access procedures. The UE delays the random access procedure R2 on the SCell until the UE completes the random access procedure R1 on the PCell. The random access procedure R2 is triggered by need of synchronization on the SCell (e.g. triggered by a PDCCH order received on the SCell or on a scheduling cell of the SCell). The random access procedure R1 is triggered by a pending SR of the UE. In other words, the UE does not perform the random access procedure R2 on the SCell until the UE completes the random access procedure R1 on the PCell.

If the random access procedure R1 on the PCell is not completed within a certain number of subframes, the UE does not perform the random access procedure R2 since a dedicated preamble for R2 is only valid within these subframes. Thus, the UE does not perform the random access procedure R2 on the SCell when the dedicated preamble became invalid after the completion of R1 on the PCell. In one embodiment, the UE will determine whether to perform the random access procedure R2 on the SCell according to whether the dedicated preamble for R2 is valid after completion of the random access procedure R1 on the PCell Therefore, the UE does not perform the random access procedure R1 on the PCell and the random access procedure R2 on the SCell at the same time. The process 60 can prevent the UE from having parallel random access procedures.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the exemplary processes can avoid the UE performing parallel random access procedures. In one example, the UE performs the random access procedure R1 on the PCell after the UE completes the random access procedure R2 on the SCell. In another example, the UE aborts the random access procedure R2 on the SCell when the UE initiates the random access procedure R1 on the PCell. In the other example, the UE delays the random access procedure R2 on the SCell until the UE completes the random access procedure R1 on the PCell.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling random access procedures for a mobile device, the method comprising:
   triggering a first random access procedure on a primary cell (PCell) at a time when a second random access procedure on a secondary cell (SCell) is ongoing or is about to start, wherein the first random access procedure is triggered by a pending scheduling request (SR) of the mobile device and the second random access procedure is triggered by need of synchronization on the SCell, and
   initiating the first random access procedure on the PCell according to a result of the second random access procedure after the mobile device completes the second random access procedure on the SCell.

2. The method of claim 1, wherein the mobile device does not initiate the first random access procedure on the PCell when the second random access procedure is completed such that all pending SR(s) of the mobile device are canceled.

3. A method of handling random access procedures for a mobile device, the method comprising: triggering a first random access procedure on a primary cell (PCell) at a time when a second random access procedure on a secondary cell (SCell) is ongoing, wherein the first random access procedure is triggered by a pending scheduling request (SR) of the mobile device and the second random access procedure is triggered by need of synchronization on the SCell;
prohibiting initiating the first random access procedure on the PCell when the mobile device has a pending scheduling request (SR) and is performing the second random access procedure on the SCell.

4. A method of handling a first random access procedure on a primary cell (PCell) for a mobile device when a second random access procedure on a secondary cell (SCell) is ongoing or is about to start, the method comprising:
aborting the second random access procedure on the SCell when the mobile device initiates the first random access procedure on the PCell, wherein the second random access procedure is triggered by need of synchronization on the SCell and the first random access procedure is triggered by a pending scheduling request (SR) of the mobile device.

5. The method of claim 4 further comprising performing the first random access procedure immediately.

6. A method of handling a first random access procedure on a primary cell (PCell) for a mobile device when a second random access procedure on a secondary cell (SCell) is ongoing or is about to start, the method comprising:
delaying the second random access procedure on the SCell until the mobile device completes the first random access procedure on a PCell, wherein the second random access procedure is triggered by need of synchronization on the SCell and the first random access procedure is triggered by a pending scheduling request (SR) of the mobile device.

7. The method of claim 6 further comprising determining whether to perform the second random access procedure on the SCell according to whether a dedicated preamble for the second random access procedure is valid after completion of the first random access procedure on the PCell.

8. The method of claim 7, wherein the second random access procedure on the SCell is not performed when the dedicated preamble becomes invalid after completion of the first random access procedure on the PCell.

* * * * *